(12) United States Patent
Truyens et al.

(10) Patent No.: US 11,975,692 B2
(45) Date of Patent: May 7, 2024

(54) WIPER BLADE APPARATUS AND WIPER SYSTEM

(71) Applicant: Robert Bosch GmbH, Stuttgart (DE)

(72) Inventors: Stijn Truyens, Tienen (BE); Balazs Czel, Budapest (HU); David Allard, Tienen (BE); Kristof Bams, Tienen (BE); Raf Greunlinx, Zolder (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/746,391

(22) Filed: May 17, 2022

(65) Prior Publication Data

US 2022/0371553 A1 Nov. 24, 2022

(30) Foreign Application Priority Data

May 19, 2021 (DE) .......................... 102021205106.5

(51) Int. Cl.
*B60S 1/38* (2006.01)
*B60S 1/52* (2006.01)

(52) U.S. Cl.
CPC .............. *B60S 1/3805* (2013.01); *B60S 1/524* (2013.01); *B60S 1/381* (2013.01); *B60S 1/3879* (2013.01)

(58) Field of Classification Search
CPC ...... B60S 1/3803; B60S 1/3805; B60S 1/524; B60S 1/3879; B60S 1/381
USPC .............. 15/250.06, 250.07, 250.08, 250.09, 15/250.201, 250.04; 219/202
See application file for complete search history.

(56) References Cited

U.S. PATENT DOCUMENTS

| | | | |
|---|---|---|---|
| 5,632,058 A * | 5/1997 | Stanak .................. | B60S 1/3805 15/250.4 |
| 9,452,736 B2 * | 9/2016 | Egner-Walter ........ | B60S 1/4038 |
| 9,533,656 B2 * | 1/2017 | Jones ...................... | B60S 1/381 |
| 9,744,948 B2 * | 8/2017 | Caillot .................... | B60S 1/381 |
| 2008/0000039 A1 * | 1/2008 | Higgs .................. | B60S 1/3805 15/250.07 |
| 2008/0256738 A1 * | 10/2008 | Malone ................ | B60S 1/3856 15/250.06 |
| 2015/0136750 A1 * | 5/2015 | Caillot .................. | B60S 1/3805 219/202 |

FOREIGN PATENT DOCUMENTS

| | | | |
|---|---|---|---|
| EP | 2272727 | * | 1/2011 |
| WO | 2012/006363 | * | 1/2012 |

* cited by examiner

*Primary Examiner* — Gary K. Graham
(74) *Attorney, Agent, or Firm* — Michael Best & Friedrich LLP

(57) ABSTRACT

A wiper blade apparatus having at least one wiper lip for wiping a window in a first wiping direction at least substantially perpendicular to a longitudinal axis of the wiper lip and a second wiping direction at least substantially perpendicular to the longitudinal axis of the wiper lip, having at least one wiper bar unit and having at least one heating unit which is arranged partially at a wiping up side, facing the first wiping direction, of the wiper bar unit and which is arranged partially at a wiping down side, facing the second wiping direction, of the wiper bar unit. It is proposed that the at least one heating unit be constructed to achieve a different heating power at the wiping up side of the wiper bar unit from at the wiping down side.

7 Claims, 2 Drawing Sheets

WIPER BLADE APPARATUS AND WIPER SYSTEM

BACKGROUND OF THE INVENTION

A wiper blade apparatus having at least one wiper lip for wiping a window in a first wiping direction at least substantially perpendicular to a longitudinal axis of the wiper lip and a second wiping direction at least substantially perpendicular to the longitudinal axis of the wiper lip, having at least one wiper bar unit and having at least one heating unit which is arranged partially at a wiping up side, facing the first wiping direction, of the wiper bar unit and which is arranged partially at a wiping down side, facing the second wiping direction, of the wiper bar unit has already been proposed.

SUMMARY OF THE INVENTION

The invention is based on a wiper blade apparatus having at least one wiper lip for wiping a window in a first wiping direction at least substantially perpendicular to a longitudinal axis of the wiper lip and a second wiping direction at least substantially perpendicular to the longitudinal axis of the wiper lip, having at least one wiper bar unit and having at least one heating unit which is arranged partially at a wiping up side, facing the first wiping direction, of the wiper bar unit and which is arranged partially at a wiping down side, facing the second wiping direction, of the wiper bar unit.

It is proposed that the at least one heating unit be constructed to produce a different heating power at the wiping up side of the wiper bar unit than at the wiping down side.

A "wiper blade apparatus" is preferably intended to be understood to be at least a portion, preferably a sub-assembly, of a wiper blade, preferably a windscreen wiper. In particular, the wiper blade apparatus may also comprise the entire wiper blade. In particular, the wiper blade apparatus may also comprise the entire windscreen wiper, in particular with the wiper blade. Preferably, the wiper blade apparatus is provided for use on a vehicle. Preferably, the wiper blade apparatus is provided, in particular as part of the windscreen wiper, for cleaning a surface, in particular a window on a vehicle. Preferably, the wiper blade apparatus is coupled for cleaning a vehicle window to a vehicle, for example, by means of a wiper arm. The term "provided" is preferably intended to be understood to be specially equipped, specially constructed, specially configured and/or specially fitted. The fact that an object is provided for a specific function is preferably intended to be understood to mean that the object performs and/or carries out this specific function in at least one application and/or operating state. The term "operating state" is preferably intended to be understood to be a state in which the wiper blade apparatus is operationally ready for a wiping procedure and/or a wiping operation and/or is at least coupled to the wiper arm and/or the vehicle and/or is in a wiper mode in which the wiper bar unit of the wiper blade apparatus, in particular of the windscreen wiper, is preferably guided over a vehicle window and advantageously adjoins the vehicle window.

Preferably, the wiper blade apparatus comprises at least one wiper blade adapter. Preferably, the wiper blade adapter is constructed to form a pivotable connection to the wiper arm, in particular to the wiper arm adapter. Preferably, the wiper blade adapter is connected to the wiper bar unit in a central region of the wiper bar unit. Preferably, the at least one wiper blade adapter can be connected to the wiper arm so as to be able to be pivoted about a pivot axis. Preferably, the pivot axis is orientated at least substantially parallel with the first wiping direction and with the second wiping direction. The term "substantially parallel" is intended in this instance to be understood to be in particular an orientation of a direction relative to a reference direction, in particular in a plane, wherein the direction with respect to the reference direction has a deviation in particular of less than 8°, advantageously less than 5° and in a particularly advantageous manner less than 2°. Preferably, the pivot axis is orientated at least substantially perpendicularly to the longitudinal axis of the wiper lip. The term "longitudinal axis" of an object is intended in particular to be understood to be an axis which extends parallel with a longest edge of a smallest geometric cuboid which still just completely surrounds the object and preferably extends through a geometric center of the object. The term "substantially perpendicular" is intended in this instance in particular to define an orientation of a direction relative to a reference direction, wherein the direction and the reference direction, in particular when viewed in a projection plane, form an angle of 90° and the angle has a maximum deviation of in particular less than 8°, advantageously less than 5° and in a particularly advantageous manner less than 2°.

Preferably, the wiper lip is formed integrally with the wiper bar unit. The wiper bar unit is preferably made from a rubber-like material. Preferably, the wiper lip is constructed for direct contact with the vehicle, in particular with the windscreen. The term "integral" is in particular intended to be understood to be formed in one piece, wherein the one piece is preferably produced from a single blank, a mass and/or a casting, in a particularly preferred manner with an injection-molding method, in particular a single-component and/or multi-component injection-molding method.

Preferably, the at least one wiper bar unit can be notionally divided into two material halves of the wiper bar unit at a geometric center plane of the wiper bar unit which is orientated in particular at least substantially parallel with the longitudinal axis of the wiper lip, in particular at least substantially parallel with a longitudinal axis of the wiper bar unit, in particular at least substantially perpendicularly to the pivot axis. Preferably, the wiper bar unit has a first material half and a second material half which are connected to each other at the geometric center plane of the wiper bar unit. Preferably, a first material half of the wiper bar unit which extends from the geometric center plane of the wiper bar unit in the direction of the first wiping direction forms the wiping up side of the wiper bar unit. Preferably, a second material half of the wiper blade unit which extends from the geometric center plane of the wiper bar unit in the direction of the second wiping direction forms the wiping down side of the wiper bar unit. Preferably, the wiping up side of an engine bonnet of the vehicle is arranged facing away in particular from an underlying surface on which the vehicle is arranged, in particular in the operating state of the wiper blade apparatus. Preferably, the wiping down side of an engine bonnet of the vehicle is arranged facing in particular the underlying surface on which the vehicle is arranged, in particular in the operating state of the wiper blade apparatus.

Preferably, the heating unit is arranged partially in the wiper bar unit in order to heat the wiper bar unit. Preferably, the heating unit is arranged partially in the wiper blade adapter, in particular in order to heat the wiper blade adapter. Preferably, the heating unit comprises an electrical connection element which is arranged on the wiper blade adapter and which is provided in particular for connection to an electric power cable.

Preferably, the at least one heating unit extends over at least 75%, preferably over at least 90%, of the wiper bar unit along the longitudinal axis of the wiper bar unit at the wiping up side of the wiper bar unit. Preferably, the at least one heating unit extends over at least 75%, preferably over at least 90%, of the wiper bar unit along the longitudinal axis of the wiper bar unit at the wiping down side of the wiper bar unit. The at least one heating unit may be made from a different material at the wiping up side from at the wiping down side, in particular in order to achieve a different heating power at the wiping up side from at the wiping down side. The at least one heating unit may be made at the wiping up side from the same material as at the wiping down side. The at least one heating unit may have a different geometry at the wiping up side from at the wiping down side, in particular in order to achieve a different heating power at the wiping up side from at the wiping down side. The at least one heating unit may have the same geometry at the wiping up side as at the wiping down side. Preferably the at least one heating unit comprises at least one heating element. The heating unit may have at least two, in particular a large number of heating elements, such as, for example, three, four five, ten, twenty or the like. The at least one heating unit may have more heating elements at the wiping up side than at the wiping down side. The at least one heating unit may have the same number of heating elements at the wiping up side as at the wiping down side. Preferably, the at least one heating unit is constructed to achieve a greater heating power at the wiping up side than at the wiping down side. Preferably, the at least one heating unit is constructed to achieve at the wiping up side a heating power accumulated over the entire wiping up side which is greater than a heating power, which is accumulated over the entire wiping down side, of the heating unit.

As a result of the configuration of the wiper blade apparatus according to the invention, an advantageous use of non-uniform heat relationships of the wiper bar unit for a selective heating of the wiper bar unit can be achieved. In particular, an energy-saving heating of the wiper blade apparatus, in particular the wiper bar unit, can be achieved. In particular, an advantageously cost-effective operation of the wiper blade apparatus can be achieved. In particular, an advantageously cost-effective heating unit can be achieved.

Furthermore, it is proposed that the at least one heating unit have a heating element which is in the form of an electrical resistance heating element and which has at the wiping up side of the wiper bar unit a different electrical resistance from at the wiping down side. Preferably, all the heating elements of the heating unit are constructed in each case as electrical resistance heating elements. The heating elements of the heating unit could alternatively be in the form of hollow space elements, such as, for example, heating members which in particular are connected to a thermal fluid reservoir. Preferably, the heating unit is in the form of a heating unit which can be operated exclusively in an electrical manner. Preferably, the at least one heating unit has at least two regions, in which the heating unit, in particular in a manner accumulated over the respective region, has different electrical resistances. Preferably, the at least one heating unit has in a manner accumulated over the entire wiping up side of the wiper bar unit an electrical resistance which has a different value from a resistance which the heating unit has in a manner accumulated over the entire wiping down side of the wiper bar unit. Preferably, the value of the electrical resistance of the heating unit accumulated over the entire wiping up side and the value of the electrical resistance of the heating unit accumulated over the entire wiping down side differ from each other by at least 1 Ohm, preferably by at least 2 Ohm, in a particularly preferred manner by at least 5 Ohm and in a quite particularly preferred manner by at least 7 Ohm. Preferably, the value of the electrical resistance of the heating unit accumulated over the entire wiping up side and the value of the electrical resistance of the heating unit accumulated over the entire wiping down side differ from each other by at least 10%, preferably by at least 20%, in a particularly preferred manner by at least 50% and in a quite particularly preferred manner by at least 100%, of the smaller value.

Preferably, the value of the electrical resistance of the heating unit accumulated over the entire wiping up side and the value of the electrical resistance of the heating unit accumulated over the entire wiping down side differ from each other by a maximum of 20 Ohm, preferably by a maximum of 15 Ohm, in a particularly preferred manner by a maximum of 12.5 Ohm and in a quite particularly preferred manner by a maximum of 11 Ohm. Preferably, the value of the electrical resistance of the heating unit accumulated over the entire wiping up side and the value of the electrical resistance of the heating unit accumulated over the entire wiping down side differ from each other by a maximum of 200%, preferably by a maximum of 150%, in a particularly preferred manner by a maximum of 130% and in a quite particularly preferred manner by at least 120%, of the smaller value, in particular in a series connection. Preferably, the value of the electrical resistance of the heating unit accumulated over the entire wiping up side and the value of the electrical resistance of the heating unit accumulated over the entire wiping down side differ from each other by at least one order of magnitude, preferably by at least two orders of magnitude, in a quite particularly preferred manner by at least three orders of magnitude, in particular in a parallel connection. It is possible to achieve an advantageously precisely defined heating power at the wiping up side and the wiping down side of the wiper bar unit.

It is further proposed that the wiper blade apparatus have a fluid output unit, for fluid output at least in the first wiping direction, which is at least partially connected to the wiper bar unit at the wiping up side. Preferably, the wiper blade apparatus comprises at least one spoiler unit. Preferably, the fluid output unit is constructed at least for the most part as the spoiler unit having at least one fluid channel, preferably at least two fluid channels. Preferably, the fluid output unit is constructed partially as at least one fluid channel. Preferably, the fluid output unit is constructed partially as at least two fluid channels, of which one fluid channel extends along the longitudinal axis of the wiper bar unit at the wiping up side through the spoiler unit and another fluid channel extends through the spoiler unit along the longitudinal axis of the wiper bar unit at the wiping down side. Preferably, the fluid output unit has at least one fluid output opening, which is constructed as an opening of the at least one fluid channel in the first or the second wiping direction. Preferably, the fluid output unit has at least two, preferably a large number of fluid output openings which are constructed as the opening of the at least two fluid channels and of which at least one fluid output opening is orientated at least substantially in the first wiping direction and of which at least one fluid output opening is orientated at least substantially in the second wiping direction. Heatable fluid channels can advantageously be achieved. In particular, a risk of freezing of the fluid channels can advantageously be reduced in an energy-saving manner.

It is further proposed that the wiper blade apparatus have at least one first resilient rail which is arranged at the wiping up side of the wiper bar unit and at least one additional resilient rail which is arranged at the wiping down side of the wiper bar unit. Preferably, the at least one heating unit is in direct contact with the at least one first resilient rail and in direct contact with the at least one additional resilient rail, in particular in order to heat the resilient rails. Preferably, the at least one heating unit extends in direct contact over at least 75%, preferably over at least 90%, of the first resilient rail along a longitudinal axis of the first resilient rail. Preferably, the at least one heating unit extends in direct contact over at least 75%, preferably over at least 90%, of the additional resilient rail along a longitudinal axis of the additional resilient rail. The term "resilient rail" is intended to be understood in particular to be a rod-like, in particular elongate object which has an extent along the longitudinal axis thereof which can be resiliently changed by at least 30% and preferably by at least 50%, wherein the object in particular produces a counter-force which is dependent on a change of the extent and which is in particular proportional to the change of the extent and which counteracts the change. Preferably, the at least one first resilient rail and/or the at least one additional resilient rail is at least partially formed from a spring steel or a coated spring steel. An advantageous heat distribution can be achieved at the wiping up side and at the wiping down side.

It is further proposed that the at least one heating unit have at least one heating element which is in the form of at least one heating wire and which is arranged at the wiping up side of the wiper bar unit in a different pattern from at the wiping down side. Preferably, each heating element of the heating unit is constructed as heating wire, in particular in series connection. For example, the heating unit is constructed as precisely one heating wire which is arranged at the wiping up side of the wiper bar unit in a different pattern from at the wiping down side. For example, the heating unit is constructed as precisely one heating wire which is arranged at the wiping up side of the wiper bar unit in a pattern in which the heating wire forms at the wiping up side an effective length which is greater than an effective length of the heating wire at the wiping down side. For example, the heating unit is constructed as precisely one heating wire which is arranged at the wiping up side of the wiper bar unit in a pattern in which the heating wire forms at the wiping up side an effective thickness which is smaller than an effective thickness of the heating wire at the wiping down side. The term "effective thickness" is intended in particular to be understood to be a thickness of the heating wire which is averaged over a defined region. For example, the heating unit is constructed as precisely one heating wire which is arranged at the wiping up side of the wiper bar unit in a pattern in which the heating wire at the wiping up side has an effective length which is greater than an effective length of the heating wire at the wiping down side, and forms an effective thickness which is smaller than an effective thickness of the heating wire at the wiping down side. Preferably, the at least one heating element is at least for the most part made from copper. Preferably, the at least one heating element is constructed as a copper heating wire. For example, the heating wire is constructed as at least two heating wires, in particular in parallel connection, of which at least one in each case is arranged at the wiping up side of the wiper bar unit and at least one is arranged at the wiping down side. For example, the heating unit is constructed as at least two heating wires, of which at least one is arranged in each case at the wiping up side of the wiper bar unit in a different pattern from at the wiping down side. For example, the heating unit is constructed as at least two heating wires, of which at least one heating wire is arranged in each case at the wiping up side of the wiper bar unit in a pattern in which the at least one heating wire forms at the wiping up side an effective length which is smaller than an effective length of the heating wire at the wiping down side. For example, the heating unit is in the form of at least two heating wires, of which one heating wire in each case at the wiping up side of the wiper bar unit has an effective thickness which is greater than an effective thickness of the at least one heating wire at the wiping up side. For example, the heating unit is constructed as at least two heating wires, of which a heating wire at the wiping up side of the wiper bar unit is arranged in each case in a pattern in which the at least one heating wire at the wiping up side forms an effective length which is smaller than an effective length of the heating wire at the wiping down side and forms an effective thickness which is greater than an effective thickness of the at least one heating wire at the wiping down side. It is possible to achieve a heating unit which can be produced advantageously in a standard manner, in particular in a cost-effective manner, and which is constructed to achieve at the wiping down side a different heating power from at the wiping up side.

It is further proposed that the at least one heating unit form at least one heating circuit which extends, on the one hand, along the wiping up side and, on the other hand, along the wiping down side. Preferably, the at least one heating circuit extends, on the one hand, along the longitudinal axis of the wiper bar unit so as to conduct current over the wiping up side of the wiper bar unit and, on the other hand, over the wiping down side of the wiper bar unit. Preferably, the heating unit is constructed as a single heating wire which forms the one heating circuit. Preferably, the heating unit has two heating elements which are constructed as different portions of the one heating wire. In particular, the at least two heating elements may be constructed in an integral manner. Alternatively, the at least one heating unit may form at least two heating circuits which are connected in parallel. Alternatively, the at least one heating unit may extend at least three times in a current-conducting manner along the longitudinal axis of the wiper bar unit, wherein the at least heating unit extends at least once along the wiping up side and at least once along the wiping down side. An advantageously cost-effective heating unit can be achieved.

It is further proposed that the at least one heating unit have at least two heating elements which are connected in series to each other, wherein at least one first heating element of the at least two heating elements is arranged at the wiping up side and at least one additional heating element of the at least two heating elements is arranged at the wiping down side. Preferably, the at least one heating element at the wiping up side has an electrical resistance which is different from an electrical resistance of the at least one heating element at the wiping down side. Preferably, all the heating elements of the heating unit are connected in series. An advantageously short, in particular cost-effective, heating circuit of the heating unit can be achieved.

It is further proposed that the at least one first heating element have at the wiping up side of the wiper bar unit a greater electrical resistance than the at least one additional heating element at the wiping down side. Preferably, the at least one first heating element at the wiping up side of the wiper bar unit has an electrical resistance which is at least one and a half times greater than, preferably at least twice as large as the at least one additional heating element at the wiping down side. Alternatively, the at least one additional heating element at the wiping down side of the wiper bar unit may have an electrical resistance which is greater than, in particular at least one and a half times greater than, preferably at least twice as large in particular as the at least one first heating element at the wiping up side. An advantageously high heating power can be achieved at the wiping up side. An advantageously low heating power can be achieved at the wiping down side, particularly since the wiper bar unit at the wiping down side is on average warmer as a result of a parking position closer to an engine bonnet.

It is further proposed that the at least one heating unit have at least two heating elements which are connected in parallel to each other, wherein at least one first heating element of the at least two heating elements is arranged at the wiping up side and at least one additional heating element of the at least two heating elements is arranged at the wiping down side. Preferably, at least a first heating element and at least one additional heating element of the heating unit are connected in parallel. In particular, at least two, in particular a plurality of first heating elements which are connected in series at the wiping up side may be connected in parallel to at least one additional heating element at the wiping down side. An advantageously energy-efficient heating unit can be achieved.

It is further proposed that the at least one additional heating element at the wiping down side of the wiper bar unit have a greater electrical resistance than the at least one first heating element at the wiping up side. Preferably, the at least one additional heating element at the wiping down side of the wiper bar unit has an electrical resistance which is at least one and a half times greater than, preferably at least twice as large as the at least one first heating element at the wiping up side. Alternatively, the at least one additional heating element at the wiping down side of the wiper bar unit may have an electrical resistance which is smaller than, in particular a maximum of two thirds as large, preferably a maximum of half as large in particular as the at least one first heating element at the wiping up side. An advantageously high heating power can be achieved at the wiping up side. An advantageously low heating power can be achieved at the wiping down side, particularly since the wiper bar unit at the wiping down side is on average warmer as a result of a parking position closer to an engine bonnet.

Furthermore, a wiper system is proposed having at least one wiper arm and having at least one wiper blade apparatus according to the invention. Preferably, the wiper system has at least one electric power cord. Preferably, the at least one electric power cord is at least partially connected to the wiper arm. Preferably, the at least one electric power cord is constructed to connect the at least one heating element, preferably on the wiper blade adapter, to a vehicle battery of the vehicle, in particular in order to supply the at least one heating element with electrical energy. An advantageous way of connecting the heating element to the vehicle can be achieved.

The wiper blade apparatus according to the invention and/or the wiper system according to the invention is/are not intended in this instance to be limited to the application and embodiment described above. In particular, the wiper blade apparatus according to the invention and/or the wiper system according to the invention in order to carry out an operating method described herein may have a number of individual elements, components and units different from the one mentioned herein. In addition, in the value ranges set out in this disclosure, values which are located within the limits mentioned should also be considered to be disclosed and to be able to be freely used.

BRIEF DESCRIPTION OF THE DRAWINGS

Other advantages will be appreciated from the following description of the drawings. In the drawings, two embodiments of the invention are illustrated. The drawings, the description and the claims contain numerous features in combination. The person skilled in the art will advantageously also consider the features individually and combine them to form other advantageous combinations.

In the drawings.

DETAILED DESCRIPTION

Figure 1:
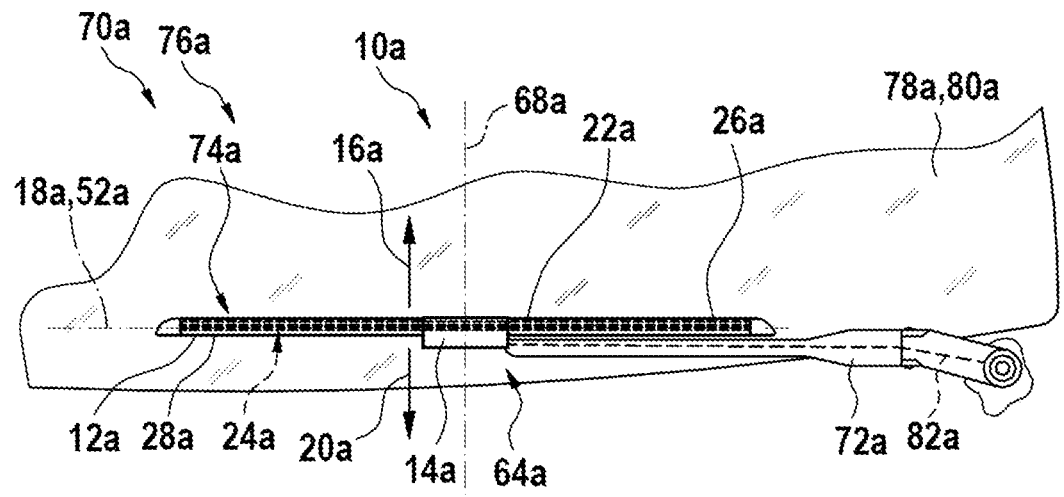
FIG. 1 shows a schematic illustration of a wiper system according to the invention with a wiper blade apparatus according to the invention.

FIG. 1 shows a wiper system 70a. The wiper system 70a comprises a wiper arm 72a. The wiper system 70a is formed for the most part by the wiper arm 72a and a wiper blade 74a. The wiper system 70a comprises the wiper blade 74a. The wiper system 70a comprises a wiper blade apparatus 10a. The wiper blade apparatus 10a is part of a windscreen wiper 76a. The wiper blade apparatus 10a is constructed as a sub-assembly of the wiper blade 74a, in particular the windscreen wiper 76a. The wiper system 70a is in particular formed as the windscreen wiper 76a. The wiper blade apparatus 10a is provided for use on a vehicle 78a. The wiper blade apparatus 10a is provided as part of the windscreen wiper 76a for cleaning a window 80a on the vehicle 78a. In order to clean the window 80a, the wiper blade apparatus 10a is coupled to the vehicle 78a by means of the wiper arm 72a.

The wiper system 70a comprises an electric power cord 82a. The electric power cord 82a is provided to supply power to the wiper blade apparatus 10a, in particular the wiper blade 74a. The electric power cord 82a is in the form of a cable. The electric power cable 82a is connected to the wiper arm 72a in portions. The electric power cord 82a is clip-fitted to the wiper arm 72a in portions. The electric power cord 82a is connected to an electrical energy store, in particular a car battery, of the vehicle 78a.

The wiper system 70a comprises a wiper arm adapter 64a. The wiper arm adapter 64a is constructed integrally with the wiper arm 72a. The wiper blade apparatus 10a comprises a wiper blade adapter 14a. The wiper blade adapter 14a is constructed to be pivotably connected to the wiper arm 72a, in particular to the wiper arm adapter 64a. The wiper blade adapter 14a is constructed to engage with the wiper arm adapter 64a, in particular the wiper arm 72a, so as to be able to be pivoted about a pivot axis 68a.

The wiper blade apparatus 10a comprises a wiper lip 12a. The wiper lip 12a is provided for wiping the window 80a in a first wiping direction 16a perpendicular to a longitudinal axis 18a of the wiper lip 12a. The wiper lip 12a is provided for wiping the window 80a in a second wiping direction 20a perpendicular to the longitudinal axis 18a of the wiper lip 12a.

The wiper blade apparatus 10a comprises a wiper bar unit 22a. The wiper bar apparatus 10a comprises a heating unit 24a. The heating unit 24a is partially arranged on a wiping up side 26a of the wiper bar unit 22a facing the first wiping direction 16a. The heating unit 24a is partially arranged at a wiping down side 28a, facing the second wiping direction 20a, of the wiper bar unit 22a. The electric power cable 82a is constructed to connect the heating unit 24a, preferably on the wiper blade adapter 14a, to the vehicle battery of the vehicle 78a, in particular in order to supply the heating unit 24a with electrical energy. The pivot axis 68a is orientated parallel with the first wiping direction 16a and the second wiping direction 20a. The wiper lip 12a is constructed integrally with the wiper bar unit 22a. The wiper bar unit 22a is made from a rubber-like material. The wiper lip 12a is constructed for direct contact with the vehicle 78a, in particular the window 80a.

Figure 2:
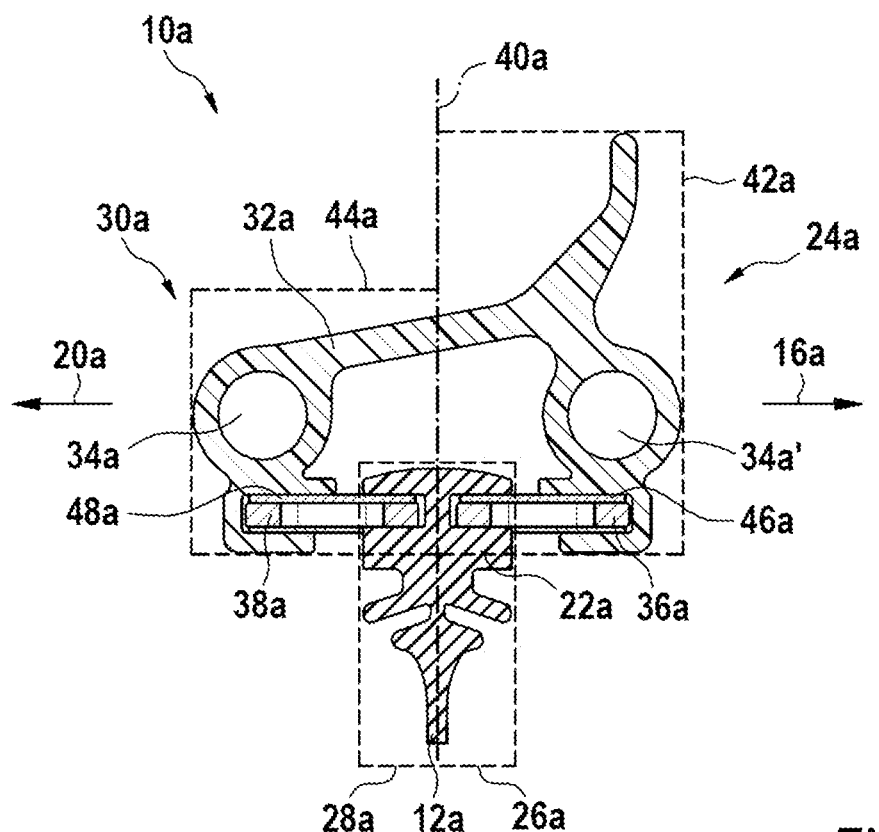
FIG. 2 shows a schematic sectioned illustration of the wiper blade apparatus according to the invention.

FIG. 2 shows that the wiper blade apparatus 10a has a fluid output unit 30a for fluid output in the first wiping direction 16a and the second wiping direction 20a. The wiper blade apparatus 10a comprises a spoiler unit 32a.

The fluid output unit 30a is constructed for the most part as the spoiler unit 32a with two fluid channels 34a, 34a'. The spoiler unit 32a, in particular the fluid output unit 30a, is partially connected to the wiper bar unit 22a at the wiping up side 26a. The spoiler unit 32a, in particular the fluid output unit 30a, is partially connected to the wiper bar unit 22a at the wiping down side 28a.

The fluid output unit 30a is partially formed as two fluid channels 34a, 34a', of which one fluid channel 34a extends along the longitudinal axis 18a of the wiper bar unit 22a at the wiping up side 26a through the spoiler unit 32a and another fluid channel 34a' extends along the longitudinal axis 18a of the wiper bar unit 22a at the wiping down side 28a through the spoiler unit 32a. The fluid output unit 30a has a large number of fluid output openings which are formed as an opening of the two fluid channels 34a, 34a' in the first wiping direction 16a and the second wiping direction 20a.

The wiper blade apparatus 10a comprises a first resilient rail 36a. The first resilient rail 36a is arranged at the wiping up side 26a of the wiper bar unit 22a. The wiper blade apparatus 10a comprises an additional resilient rail 38a. The additional resilient rail 38a is arranged at the wiping down side 28a of the wiper bar unit 22a. The first resilient rail 36a and the additional resilient rail 38a is made from a spring steel. The heating unit 24a is arranged in direct contact with the first resilient rail 36a and in direct contact with the additional resilient rail 38a, in particular in order to heat the resilient rails 36a, 38a. The heating unit 24a extends in direct contact over at least 90% of the first resilient rail 36a along a longitudinal axis of the first resilient rail 36a. The heating unit 24a extends in direct contact over at least 90% of the additional resilient rail 38a along a longitudinal axis of the additional resilient rail 38a.

The wiper bar unit 22a can be notionally divided in a geometric center plane 40a of the wiper bar unit 22a which is orientated parallel with the longitudinal axis 18a of the wiper lip 12a, in particular parallel with a longitudinal axis 52a of the wiper bar unit 22a, in particular perpendicularly to the pivot axis 68a, into two material halves of the wiper bar unit 22a (cf. FIG. 1). A first material half of the wiper bar unit 22a, which extends from the geometric center plane 40a of the wiper bar unit 22a in the direction of the first wiper direction 16a, forms the wiping up side 26a of the wiper bar unit 22a (cf. FIG. 2). A second material half of the wiper bar unit 22a which extends from the geometric center plane 40a of the wiper bar unit 22a in the direction of the second wiping direction 20a forms the wiping down side 28a of the wiper bar unit 22a (cf. FIG. 2).

The spoiler unit 32a can be notionally divided in the geometric center plane 40a of the wiper bar unit 22 which extends parallel with the longitudinal axis 18a of the wiper lip 12a, in particular parallel with the longitudinal axis 52a of the wiper bar unit 22, in particular perpendicularly to the pivot axis 68a, into two material halves of the spoiler unit 32a. A first material half of the spoiler unit 32a which extends from the geometric center plane 40a of the spoiler unit 32a in the direction of the first wiping direction 16a forms a wiping up side 42a of the spoiler unit 32a (cf. FIG. 2). A second material half of the spoiler unit 32a which extends from the geometric center plane 40a of the spoiler unit 32a in the direction of the second wiping direction 20a forms a wiping down side 44a of the spoiler unit 32a (cf. FIG. 2).

The wiping up side 26a, 42a of the wiper bar unit 22a and the spoiler unit 32a is arranged facing away from an engine bonnet of the vehicle 78a, in particular an underlying surface on which the vehicle 78a is arranged, in particular in the operating state of the wiper blade apparatus 10a. The wiping down side 28a, 44a of the wiper bar unit 22a and the spoiler unit 32a is arranged facing an engine bonnet of the vehicle 78a, in particular the underlying surface on which the vehicle 78a is arranged, in particular in the operating state of the wiper blade apparatus 10a.

The heating unit 24a is partially arranged in two resilient rail recesses of the wiper bar unit 22a in order to heat the wiper bar unit 22a. The heating unit 24a is partially arranged in two resilient rail recesses of the spoiler unit 32a in order to heat the wiper bar unit 22a. The heating unit 24a is partially arranged in the wiper blade adapter 14a, in particular in order to heat the wiper blade adapter 14a. The heating unit 24a comprises an electrical connection element (not shown) which is arranged on the wiper blade adapter 14a and which in particular is provided for connection to an electric power cable 82a.

The heating unit 24a extends over more than 75% of the wiper bar unit 22a along the longitudinal axis 52a of the wiper bar unit 22a at the wiping up side 26a of the wiper bar unit 22a. The heating unit 24 extends over more than 75% of the wiper bar unit 22a along the longitudinal axis 52a of the wiper bar unit 22a at the wiping down side 28a of the wiper bar unit 22a.

The heating unit 24a is constructed to achieve at the wiping up side 26a of the wiper bar unit 22a a different heating power from at the wiping down side 28a of the wiper bar unit 22a. The heating unit 24a is constructed to achieve at the wiping up side 42a of the spoiler unit 32a a different heating power than at the wiping down side 44a of the spoiler unit 32a. The heating unit 24a is constructed to achieve a different heating power at the first resilient rail 36a from at the additional resilient rail 38a.

The heating unit 24a is made by way of example at the wiping up side 26a, 42a from the same material as at the wiping down side 28a, 44a. The heating unit 24a has, for example, at the wiping up side 26a a different geometry from at the wiping down side 28a, in particular in order to achieve a different heating power at the wiping up side 26a than at the wiping down side 28a.

The heating unit 24a is constructed to achieve a greater heating power at the wiping up side 26a, 42a than at the wiping down side 28a, 44a. The heating device 24a is constructed to achieve at the wiping up side 26a, 42a a heating power accumulated over the entire wiping up side 26a, 42a which is greater than a heating power of the heating unit 24a which is accumulated over the entire wiping down side 28a, 44a.

The heating unit 24a comprises at least one heating element 46a, 48a which is constructed as an electrical resistance heating element 46a, 48a and which has at the wiping up side 26a of the wiper bar unit 22a a different electrical resistance from at the wiping down side 28a. The heating unit 24a comprises at least one heating element 46a, 48a which is constructed as an electrical resistance heating element and which has at the wiping up side 42a of the spoiler unit 32a a different electrical resistance from at the wiping down side 44a. The heating unit 24a comprises by way of example two heating elements 46a, 48a. The heating unit 24a has at the wiping up side 26a, 42a the same number of heating elements 46a, 48a as at the wiping down side 28a, 44a. All the heating elements 46a, 48a of the heating unit 24a are in each case constructed as electrical resistance heating elements. The heating unit 24a is constructed as an exclusively electrically operable heating unit 24a. The heating unit 24a has at least two regions, in which the heating unit 24a, in particular in a manner accumulated over the respective region, has different electrical resistances.

The heating unit 24a has in a manner accumulated over the entire wiping up side 26a of the wiper bar unit 22a an electrical resistance which has a different value from a resistance which the heating unit 24a has in a manner accumulated over the entire wiping down side 28a of the wiper bar unit 22a. The heating unit 24a has in a manner accumulated over the entire wiping up side 42a of the spoiler unit 32a an electrical resistance which has a different value from a resistance which the heating unit 24a has in a manner accumulated over the entire wiping down side 44a of the spoiler unit 32a.

The value of the electrical resistance of the heating unit 24a in a manner accumulated over the entire wiping up side 26a, 42a and the value of the electrical resistance of the heating unit 24a in a manner accumulated over the entire wiping down side 28a, 44a differ by at least 5 Ohm. The value of the electrical resistance of the heating unit 24a in a manner accumulated over the entire wiping up side 26a, 42a and the value of the electrical resistance of the heating unit 24a in a manner accumulated over the entire wiping down side 28a, 44a differ by at least 50% of the smaller value. The value of the electrical resistance of the heating unit 24a in a manner accumulated over the entire wiping up side 26a, 42a and the value of the electrical resistance of the heating unit 24a in a manner accumulated over the entire wiping down side 28a, 44a differ by a maximum of 12.5 Ohm. The value of the electrical resistance of the heating unit 24a in a manner accumulated over the entire wiping up side 26a, 42a and the value of the electrical resistance of the heating unit 24a in a manner accumulated over the entire wiping down side 28a, 44a differ by a maximum of 150% of the smaller value.

The heating unit 24a has two heating elements 46a, 48a. The two heating elements 46a, 48a are connected in series to each other. A first heating element 46a of the two heating elements 46a, 48a is arranged at the wiping up side 26a, 42a. An additional heating element 48a of the two heating elements 46a, 48a is arranged at the wiping up side 28a, 44a. The at least two heating elements 46a, 48a are constructed integrally. The first heating element 46a has a resistance of 15 Ohm. The additional heating element 48a has a resistance of 7 Ohm.

The first heating element 46a at the wiping up side 26a, 42a has an electrical resistance which is different from an electrical resistance of the additional heating element 48a at the wiping down side 28a, 44a. All the heating elements 46a, 48a of the heating unit 24a are connected in series.

The first heating element 46a at the wiping up side 26a, 42a of the wiper bar unit 22a, in particular the spoiler unit 32a, has a greater electrical resistance than the additional heating element 48a at the wiping down side 28a, 44a. The first heating element 46a at the wiping up side 26a, 42a of the wiper bar unit 22, in particular the spoiler unit 32a, has an electrical resistance which is at least one and a half times greater than, preferably at least twice as large as that of the additional heating element 48a at the wiping down side 28a, 44a of the wiper bar unit 22a, in particular the spoiler unit 32a.

The heating unit 24a has two heating elements 46a, 48a which are constructed as heating wires. The first heating element 46a is arranged at the wiping up side 26a, 42a of the wiper bar unit 22a, in particular of the spoiler unit 32a, in a different pattern from the other heating element 48a at the wiping down side 28a, 44a. The first heating element 46a is constructed at the wiping up side 26a, 42a of the wiper bar unit 22a, in particular of the spoiler unit 32, in the form of a loop, in particular in a meandering manner. The additional heating element 48a at the wiping down side 28a, 44a of the wiper bar unit 22a, in particular the spoiler unit 32a, is arranged in a linear manner, in particular along the longitudinal axis 18a of the wiper lip 12a. Each heating element 46a, 48a of the heating unit 24a is constructed as a heating wire and connected in series relative to each other.

The heating unit 24a is in the form of two heating wires, of which one heating wire is arranged at the wiping up side 26a, 42a of the wiper bar unit 22a, in particular of the spoiler unit 32a, in a different pattern from at the wiping down side 28a, 44a.

For example, the heating unit 24a is in the form of two connected heating wires, of which one heating wire, in particular the first heating element 46a which is in the form of a heating wire, is arranged at the wiping up side 26a, 42a of the wiper bar unit 22a, in particular of the spoiler unit 32a, in a pattern in which the heating wire at the wiping up side 26a, 42a forms an effective length which is greater than an effective length of the heating wire, in particular of the additional heating element 48a which is in the form of a heating wire, at the wiping down side 28, 44a.

For example, the heating unit 24a is in the form of two connected heating wires, of which one heating wire, in particular the first heating element 46a which is in the form of a heating wire, at the wiping up side 26a, 42a of the wiper bar unit 22a, in particular of the spoiler unit 32a, has an effective thickness which is smaller than the effective thickness of the heating wire, in particular of the additional heating element 48a which is in the form of a heating wire, at the wiping down side 28a, 44a. The two heating elements 46a, 48a are made from copper. The two heating elements 46a, 48a are in the form of connected copper heating wires.

The heating unit 24a forms a heating circuit 50a, which extends, on the one hand, along the wiping up side 26a, 42a and, on the other hand, along the wiping down side 28a, 44a. The heating circuit 50a extends in each case, on the one hand, along the longitudinal axis 52a of the wiper bar unit 22a in a current-conducting manner over the wiping up side 26a, 42a of the wiper bar unit 22a, in particular of the spoiler unit 32*a*, and, on the other hand, over the wiping down side 28*a*, 44*a* of the wiper bar unit 22*a*, in particular of the spoiler unit 32*a*.

Figure 3:
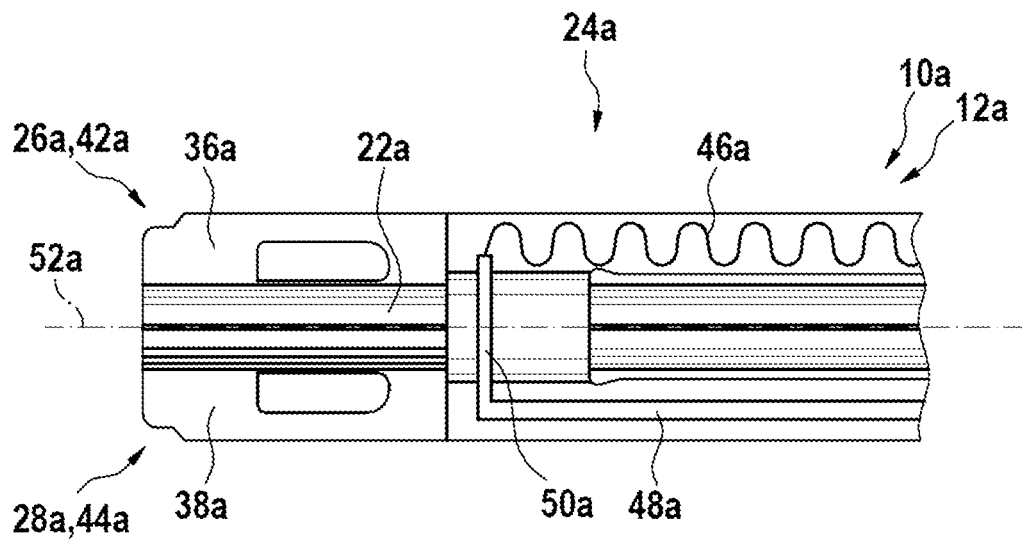
FIG. 3 shows a schematic illustration of the wiper blade apparatus according to the invention.
Figure 4:
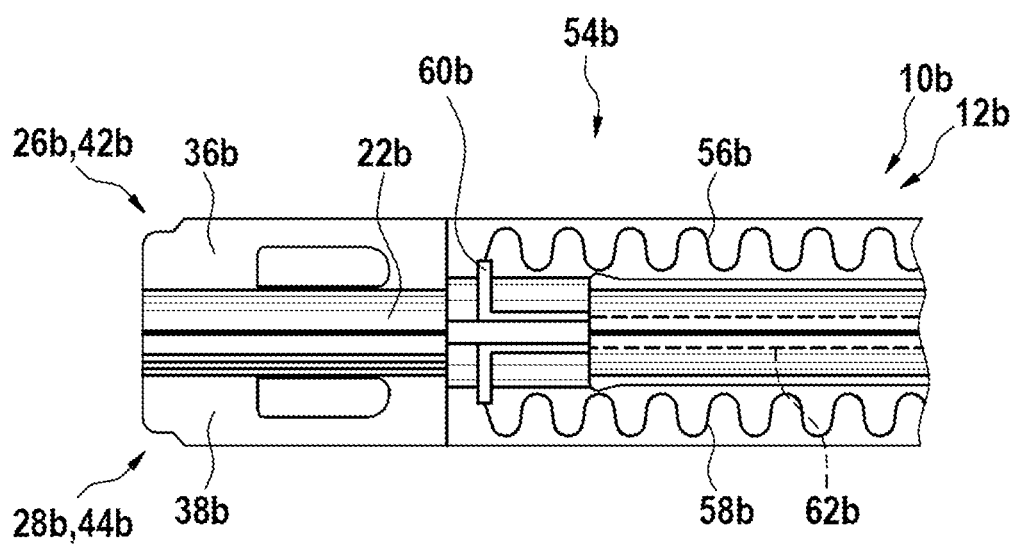
FIG. 4 shows a schematic illustration of an alternative wiper blade apparatus according to the invention.

FIG. 4 shows another embodiment of the invention. The following descriptions and the drawings are substantially limited to the differences between the embodiments, wherein with regard to components which have the same designation, in particular with respect to components with the same reference numerals, reference can in principle also be made to the drawings and/or the description of the other embodiments, in particular FIGS. 1 to 3. In order to distinguish the embodiments, the letter a is added to the reference numerals of the embodiment in FIGS. 1 to 3. In the embodiment of FIG. 4, the letter a is replaced by the letter b.

The embodiments of FIGS. 1 to 3 and FIG. 4 differ as a result of the embodiments of respective heating units 24*a*, 54*b*.

FIG. 4 shows an alternative wiper blade apparatus 10*b*. The wiper blade apparatus 10*b* has a heating unit 54*b*. The wiper blade apparatus 10*b* has a wiper bar unit 22*b*, a wiper lip 12*b*, two resilient rails 36*b*, 38*b* and a spoiler unit 32*b*.

The heating unit 54*b* has at least two heating elements 56*b*, 58*b*. The two heating elements 56*b*, 58*b* are connected to each other in parallel. The heating unit 54*b* forms two heating circuits 60*b*, 62*b* which are connected in parallel.

A first heating element 56*b* of the two heating elements 56*b*, 58*b* is arranged at a wiping up side 26*b*, 42*b*. Another heating element 58*b* of the two heating elements 56*b*, 58*b* is arranged at a wiping down side 28*b*, 44*b*. The first heating element 56*b* and the additional heating element 58*b* of the heating unit 54*b* are connected in parallel.

The additional heating element 46*b* at the wiping down side 28*b*, 44*b* of the wiper bar unit 22*b*, in particular of the spoiler unit 32*b*, has a greater electrical resistance than the first heating element 58*b* at the wiping up side 26*b*, 42*b*.

The additional heating element 58*b* at the wiping down side 28*b*, 44*b* of the wiper bar unit 22*b*, in particular of the spoiler unit 32*b*, has an electrical resistance which is at least twice as large as that of the first heating element 56*b* at the wiping up side 26*b*, 42*b*. The additional heating element 58*b* at the wiping down side 28*b*, 44*b* of the wiper bar unit 22*b*, in particular of the spoiler unit 32*b*, has an electrical resistance which is greater by at least two orders of magnitude than the first heating element 56*b* at the wiping up side 26*b*, 42*b*. The first heating element 56*b* at the wiping up side 26*b*, 42*b* of the wiper bar element 22*b*, in particular of the spoiler unit 32*b*, has an electrical resistance of 7 Ohm.

The value of the electrical resistance of the heating unit 54*b* accumulates over the entire wiping up side 26*b*, 42*b* and the value of the electrical resistance of the heating unit 54*b* accumulates over the entire wiping down side 28*b*, 44*b* by at least two orders of magnitude. The heating unit 54*b* extends four times in a current-conducting manner along the longitudinal axis 52*b* of the wiper bar unit 22*b*, wherein the heating unit 54*b* extends at least twice along the wiping up side 26*b*, 42*b* and at least twice along the wiping down side 28*b*, 44*b*.

The heating unit 54*b* has at the wiping up side 26*b*, 42*b* the same geometry, in particular the same pattern, as at the wiping down side 28*b*, 44*b*. The heating unit 54*b* has a meandering geometry at the wiping up side 26*b*, 42*b*. The heating unit 54*b* is in the form of two heating wires, in particular in a parallel arrangement, of which one is arranged in each case at the wiping up side 26*b*, 42*b* of the wiper bar unit 22*b*, in particular of the spoiler unit 32*b*, and one is arranged at the wiping down side 28*b*, 44*b*.

For example, the heating unit 54*b* is in the form of two heating wires, of which one heating wire in each case, in particular the first heating element 56*b* which is in the form of a heating wire, at the wiping up side of 26*b*, 42*b* of the wiper bar unit 22*b*, in particular of the spoiler unit 32*b*, has an effective thickness which is greater than an effective thickness of the at least one heating wire, in particular the additional heating element 58*b* which is in the form of a heating wire, at the wiping down side 28*b*, 44*b*.

What is claimed is:

1. A wiper blade apparatus having at least one wiper lip (12*a*; 12*b*) for wiping a window (80*a*; 80*b*) in a first wiping direction (16*a*; 16*b*) at least substantially perpendicular to a first longitudinal axis (18*a*; 18*b*) of the at least one wiper lip (12*a*; 12*b*) and a second wiping direction (20*a*; 20*b*) at least substantially perpendicular to the longitudinal axis (18*a*; 18*b*) of the at least one wiper lip (12*a*; 12*b*), the wiper blade apparatus having at least one wiper bar unit (22*a*; 22*b*) extending along a second longitudinal axis (52*a*; 52*b*) that is parallel to the first longitudinal axis (18*a*; 18*b*), wherein the at least one wiper bar unit (22*a*; 22*b*) includes at least one heating unit (24*a*; 54*b*) having a first heating element (46*a*; 56*b*) at a wiping up side (26*a*; 26*b*) of the at least one wiper bar unit (22*a*; 22*b*), and positioned on one side of the second longitudinal axis (52*a*; 52*b*) and facing the first wiping direction (16*a*; 16*b*), and a second heating element (48*a*; 58*b*) at a wiping down side (28*a*; 28*b*) of the at least one wiper bar unit (22*a*; 22*b*), directly on an opposite side of the second longitudinal axis (52*a*; 52*b*) and facing the second wiping direction (20*a*; 20*b*), wherein the at least one heating unit (24*a*; 54*b*) is constructed to achieve a different heating power at the wiping up side (26*a*; 26*b*) of the at least one wiper bar unit (22*a*; 22*b*) from at the wiping down side (28*a*; 28*b*) wherein the first heating element (46*a*, 56*b*) and the second heating element (48*a*, 58*b*) are connected to each other in parallel, such that the at least one heating unit (24*a*, 54*b*) forms two heating circuits (60*b*, 62*b*) electrically connected in parallel;

wherein at least one first resilient rail (36*a*, 38*a*; 36*b*, 38*b*) is arranged at the wiping up side (26*a*; 26*b*) of the at least one wiper bar unit (22*a*, 22*b*) and at least one additional resilient rail (36*a*, 38*a*; 36*b*, 38*b*) is arranged at the wiping down side (28*a*; 28*b*) of the at least one wiper bar unit (22*a*; 22*b*);

wherein the first heating element (46*a*; 56*b*) is positioned on top of the at least one first resilient rail (36*a*, 38*a*; 36*b*, 38*b*), and the second heating element (56*b*, 58*b*) is positioned on top of the at least one additional resilient rail (36*a*, 38*a*; 36*b*, 38*b*), wherein the at least one first resilient rail (36*a*, 38*a*; 36*b*, 38*b*) and the at least one additional rail (36*a*, 38*a*; 36*b*, 38*b*) are spaced apart from one another, and are separated by a portion of the at least one wiper bar unit (22*a*; 22*b*), and wherein the first heating element (46*a*; 56*b*) and the second heating element (56*b*, 58*b*) are spaced apart from one another, and are also separated by the portion of the at least one wiper bar unit (22*a*; 22*b*).

2. The wiper blade apparatus according to claim 1, wherein the first heating element (46*a*; 56*b*) and the second heating element (48*a*; 58*b*) are each in the form of an electrical resistance heating element and wherein the first heating element (46*a*; 56*b*) has a different electrical resistance than the second heating element (48*a*; 58*b*).

3. The wiper blade apparatus according to claim 1, characterized by a fluid output unit (30*a*; 30*b*) for fluid output at least in the first wiping direction (16*a*; 16*b*) which is connected at least partially at the wiping up side (26*a*; 26*b*) to the at least one wiper bar unit (22*a*; 22*b*).

4. The wiper blade apparatus according to claim 1, wherein the first heating element (46*a*) is in the form of at least one heating wire and is arranged at the wiping up side (26*a*) of the at least one wiper bar unit (22*a*) in a different pattern from the second heating element (48*a*) at the wiping down side (28*a*).

5. The wiper blade apparatus at least according to claim 1, wherein the first heating element (46*a*) has at the wiping up side (26*a*) of the at least one wiper bar unit (22*a*) a greater electrical resistance than the second heating element (48*a*) at the wiping down side (28*a*).

6. The wiper blade apparatus at least according to claim 1, wherein the second heating element (56*b*, 58*b*) at the wiping down side (28*b*) of the at least one wiper bar unit (22*b*) has a greater electrical resistance than the first heating element (58*b*) at the wiping up side (26*b*).

7. A wiper system having at least one wiper arm (72*a*; 72*b*) and having at least one wiper blade apparatus (10*a*; 10*b*) according to claim 1.

\* \* \* \* \*